United States Patent
Lin et al.

(10) Patent No.: US 8,213,512 B2
(45) Date of Patent: Jul. 3, 2012

(54) DETERMINING AN INTERMEDIATE IMAGE

(75) Inventors: Pin-Ting Lin, Taipei (TW);
Yueh-Hsuan Chiang, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 1071 days.

(21) Appl. No.: 12/128,151

(22) Filed: May 28, 2008

(65) Prior Publication Data

US 2009/0296814 A1 Dec. 3, 2009

(51) Int. Cl.
*H04N 7/12* (2006.01)
(52) U.S. Cl. .......... 375/240.16; 375/240.12; 375/240.01
(58) Field of Classification Search .......... 375/240.01, 375/240.12, 240.16
See application file for complete search history.

(56) References Cited

U.S. PATENT DOCUMENTS

| | | | |
|---|---|---|---|
| 5,400,087 A * | 3/1995 | Uramoto et al. ............. | 348/699 |
| 5,767,922 A | 6/1998 | Zabih et al. | |
| 5,777,682 A | 7/1998 | De Haan et al. | |
| 5,914,725 A * | 6/1999 | MacInnis et al. ............. | 345/441 |
| 5,991,463 A * | 11/1999 | Greggain et al. ............. | 382/298 |
| 6,005,639 A | 12/1999 | Thomas et al. | |
| 6,219,436 B1 | 4/2001 | De Haan et al. | |
| 6,487,313 B1 | 11/2002 | De Haan et al. | |
| 6,539,128 B1 * | 3/2003 | Lee et al. ...................... | 382/300 |
| 6,639,944 B1 * | 10/2003 | De Haan et al. ......... | 375/240.17 |
| 6,683,645 B1 | 1/2004 | Collins et al. | |
| 6,925,195 B2 | 8/2005 | Cahill et al. | |
| 7,272,182 B1 * | 9/2007 | Nakagawa et al. ...... | 375/240.16 |
| 7,474,625 B2 * | 1/2009 | Ungermann et al. ......... | 370/252 |
| 2007/0070250 A1 | 3/2007 | Zhou et al. | |
| 2008/0181306 A1 * | 7/2008 | Kim et al. ................ | 375/240.16 |

* cited by examiner

*Primary Examiner* — Ricky Ngo
*Assistant Examiner* — Dewanda Samuel
(74) *Attorney, Agent, or Firm* — Thomas, Kayden, Horstemeyer & Risley, LLP

(57) ABSTRACT

Included are embodiments for determining an intermediate image. At least one embodiment includes receiving data associated with a first motion vector and receiving data associated with a second motion vector, wherein the first motion vector and the second motion vector define a first image and a second image. Some embodiments include determining a single set of potential pixel values for an intermediate image, the single set of pixel values being determined from the first motion vector and the second motion vector and creating the intermediate image from the single set of potential pixel values.

24 Claims, 8 Drawing Sheets

DETERMINING AN INTERMEDIATE IMAGE

BACKGROUND

As computer architecture has evolved, the desire to render increasingly more complex visual displays has also evolved. More specifically, while images were rarely displayed in early computing devices, today's computing devices are often configured to display images, graphics, and/or videos. Similarly, as the visual data for rendering has evolved, more data may be required to render the visual data. As such, new techniques are desired for facilitating accurate rendering of the data. Additionally, as the data for rendering increases, new techniques are desired to increase the speed and decrease the number of clock cycles for rendering the visual data.

SUMMARY

Included are embodiments for determining an intermediate image. At least one embodiment includes receiving a first image, receiving a second image, generating a first motion vector and a second motion vector from the first image and the second image, and allocating a first pixel of an intermediate image associated with the first motion vector. Some embodiments include allocating a second pixel of the intermediate image associated with the second motion vector, generating a potential pixel value of the first pixel and a potential pixel value of the second pixel, and creating the intermediate image from the potential pixel values.

Also included are embodiments of a system for determining an intermediate image. At least one embodiment includes a first receiving component configured to receive data associated with a first motion vector and a second receiving component configured to receive data associated with a second motion vector, wherein the first motion vector and the second motion vector define a first image and a second image. Some embodiments include a first determining component configured to determine a single set of potential pixel values for an intermediate image, the single set of pixel values being determined from the first motion vector and the second motion vector and a creating component configured to create the intermediate image from the single set of potential pixel values.

Also included are embodiments of a computer readable medium. At least one embodiment of a computer readable medium includes first receiving logic configured to receive data associated with a first motion vector and second receiving logic configured to receive data associated with a second motion vector, wherein the first motion vector and the second motion vector define a first image and a second image. Some embodiments include first determining logic configured to determine a single set of potential pixel values for an intermediate image, the single set of pixel values being determined from the first motion vector and the second motion vector and creating logic configured to create the intermediate image from the single set of potential pixel values.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Embodiments disclosed herein include systems and methods that are configured use more than one motion vector for motion-compensated interpolation. Additionally, embodiments include determining a single set of potential pixel values from the motion vectors and/or pixel images. Similarly, some embodiments include utilizing an algorithm for determining, from the single set of potential pixel values, interpolated values for an intermediate image. Other embodiments are also discussed. For purposes of this disclosure, the phrases "intermediate image" and "interpolated image" are used interchangeably throughout the disclosure.

Figure 1:
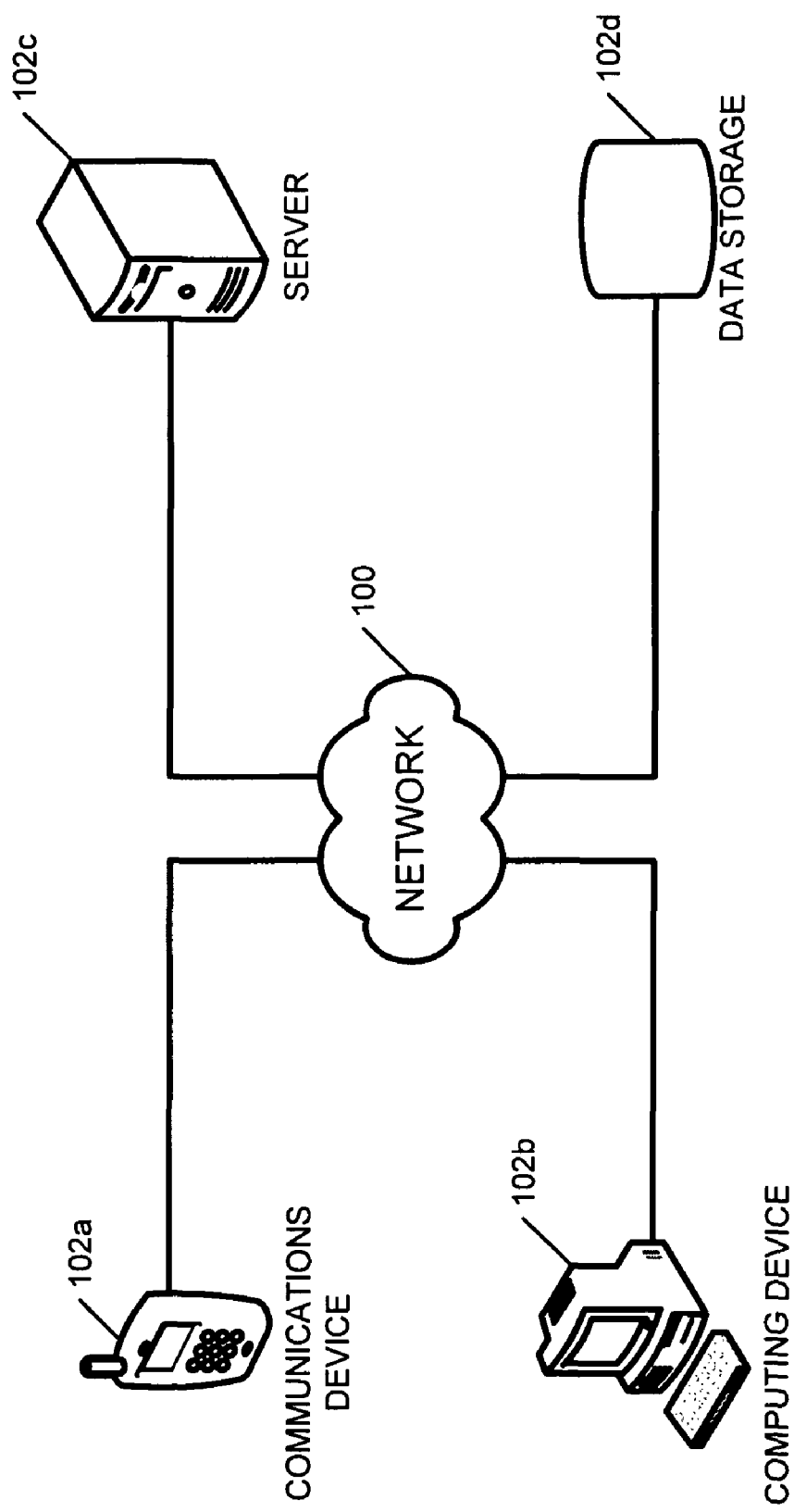
FIG. 1 is a nonlimiting example of a network that includes at least one computing device.

FIG. 1 is a nonlimiting example of a network that includes at least one computing device. As illustrated in the nonlimiting example of FIG. 1, a network 100 may be coupled to one or more devices for sending and/or receiving data. More specifically, the network 100 may include the Internet, a Public Switched Telephone Network (PSTN), a Mobile Telephone Network (MTN), and/or other Wide Area Network (WAN). Similarly, the network 100 may include a wired and/or wireless Local Area Network (LAN).

Coupled to the network 100 are a communications device 102a, a computing device 102b, a server 102c, and a data storage component 102d. The communications device 102a may include mobile telephone capabilities, cordless telephone capabilities and/or other communications and/or computing capabilities. Similarly, the computing device 102b may include a personal computer, laptop computer, PDA, etc. Depending on the particular configuration, the computing device 102b may also include communications capabilities, similar to the communications device 102a.

Also included are the server 102c and the data storage component 102d. The server 102c may be configured to provide data to and receive data from the communications device 102a and/or the computing device 102b. The server may be configured as a web server; however this is not a requirement. Similarly, the data storage component 102d may be configured to receive and store data from the server 102c, the computing device 102b and/or the communications device 102a.

Figure 2:
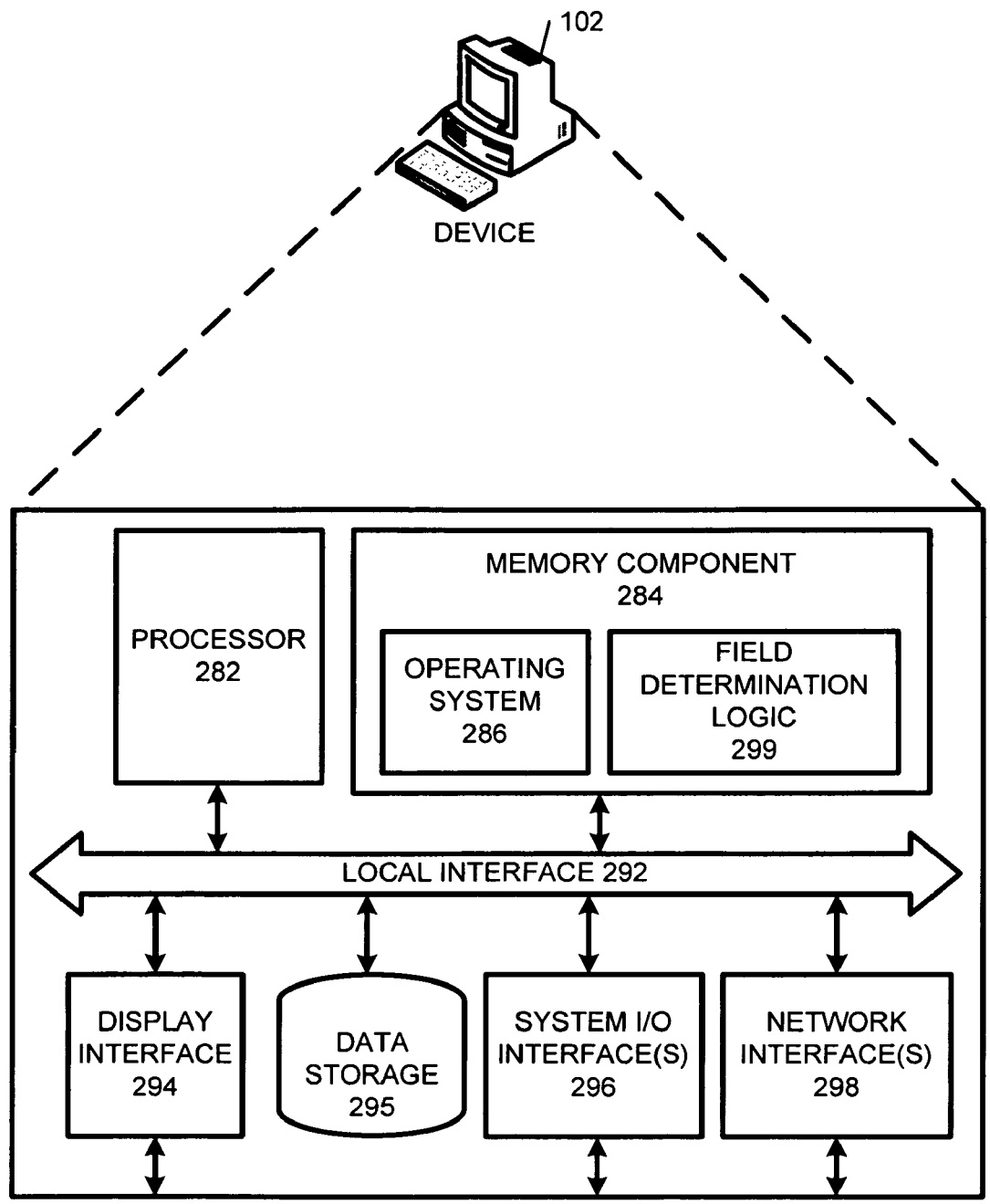
FIG. 2 is a nonlimiting example of a computing device, such as the computing device from FIG. 1.

FIG. 2 is a nonlimiting example of a computing device, such as the computing device from FIG. 1. Although a wireline device is illustrated, this discussion can be applied to wireless devices, as well. According to exemplary embodiments, in terms of hardware architecture, the device 102 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the memory component 284 may include the image determination logic 299, as well as an operating system 286. The operating system 286 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

The Input/Output devices that may be coupled to the system I/O Interface(s) 296 may include input devices, for example but not limited to, a keyboard, mouse, scanner, touch screen, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the device 102 can include the network interface 298 that includes a Personal Computer Memory Card International Association (PCMCIA) card (also abbreviated as "PC card") for receiving a wireless network card, this is a nonlimiting example. Other configurations can include the communications hardware within the device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the device 102 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the device 102 is activated.

When the device 102 is in operation, the processor 282 may be configured to execute software stored within the memory component 284, to communicate data to and from the memory component 284, and to generally control operations of the device 102 pursuant to the software. Software in the memory component 284, in whole or in part, may be read by the processor 282, perhaps buffered within the processor 282, and then executed.

One should note that while the description with respect to FIG. 2 includes the device 102 as a single component, this is a nonlimiting example. More specifically, in at least one embodiment, the device 102 can include a plurality of servers, personal computers, telephones, and/or other devices. Similarly, while the description of FIG. 2 describes the device 102, this is also a nonlimiting example, as other components may also be included in this description.

Additionally, while the image determination logic 299 is illustrated in FIG. 2 as including a single software component, this is also a nonlimiting example. In at least one embodiment, the image determination logic 299 may include one or more components, embodied in software, hardware, and/or firmware. Additionally, while the image determination logic 299 is depicted as residing on a single device, such as device 102, the image determination logic 299 may include one or more components residing on one or more different devices.

The embodiments disclosed herein can be implemented in hardware, software, firmware, or a combination thereof. At least one embodiment disclosed herein is implemented in software and/or firmware that is stored in a memory and that is executed by a suitable instruction execution system. If implemented in hardware, as in an alternative embodiment, embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a image programmable gate array (FPGA), etc.

Figure 3:
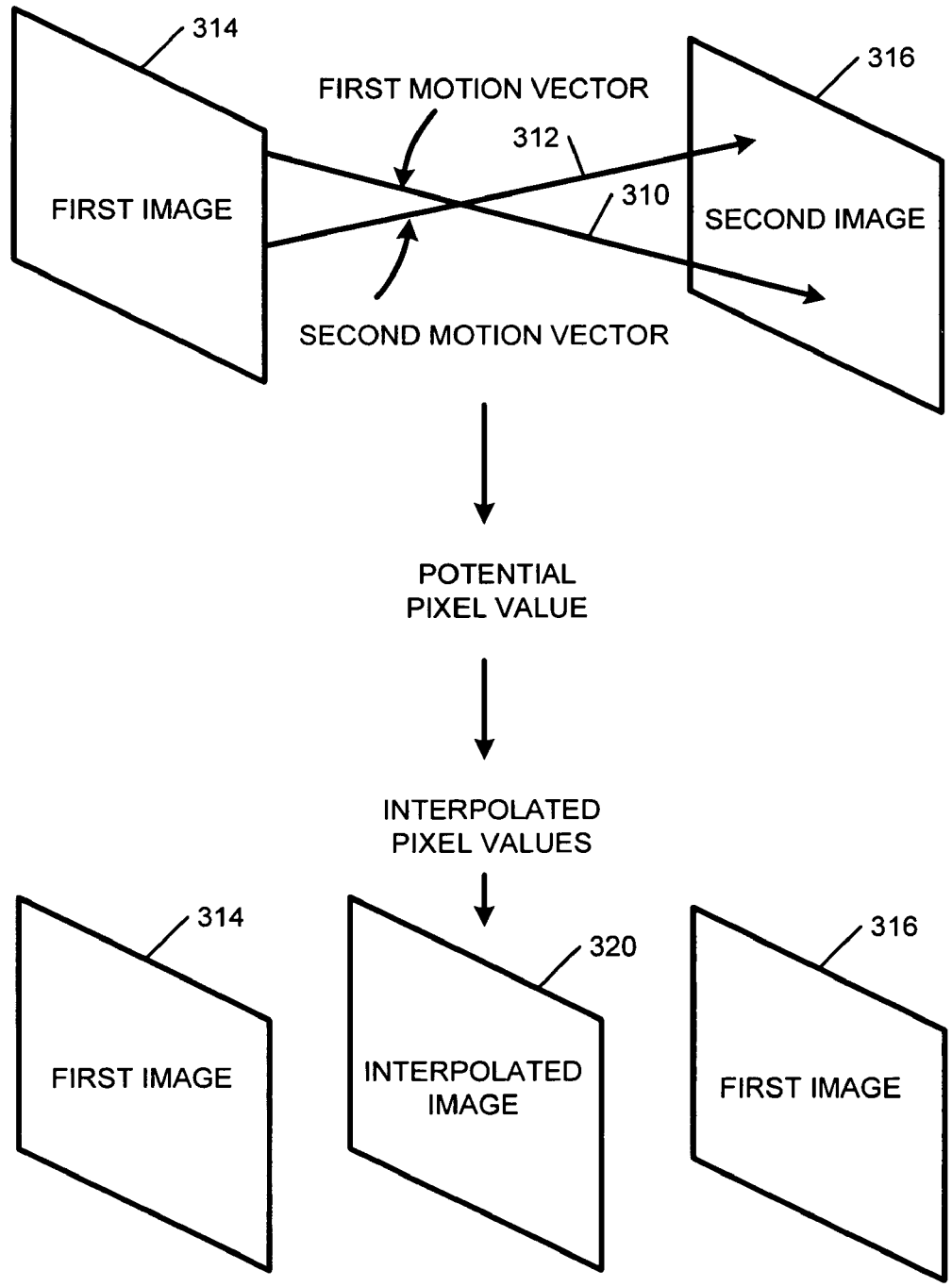
FIG. 3 is a nonlimiting example of the creation of an interpolated image, utilizing first potential pixel values and second potential pixel values, such as in the computing device from FIG. 2.

FIG. 3 is a nonlimiting example of the creation of an interpolated image, utilizing first potential pixel values and second potential pixel values, such as in the computing device from FIG. 2. As illustrated in the nonlimiting example of FIG. 3, in video processing and/or graphics processing a first image 314 may be utilized to provide a visual presentation of data and may include a first plurality of pixels. Similarly, a second image 316 may also be included to provide a visual representation of data and may include a second plurality of pixels. In at least one embodiment, the first image 314 may be derived from the same sequence of images as the second image 316 to provide a common video stream. As such, a first motion vector 310 may define motion of an object from the first image 314 to the second image 316. Similarly, the second motion vector 312 may be configured to define the motion of a second object from the first image 314 to the second image 316. As a nonlimiting example, the images may be recording an apple dropping from the tree and the leaves of the apple tree are swinging due to the wind. The images are divided into several blocks. The objects, such as the apple and the leaves, represented on the images may change as time progresses. In other words, the objects may represent in different pixels of the images and the motion vectors may be generated from the changes of all objects represented on two sequences of images.

In many configurations, one or more potential pixel values can be determined from the first motion vector 312 and second motion vector 314 and a set of interpolated pixel values can be determined from the potential pixel values for defining an interpolated image 320, as described in more detail, below.

Figure 4:
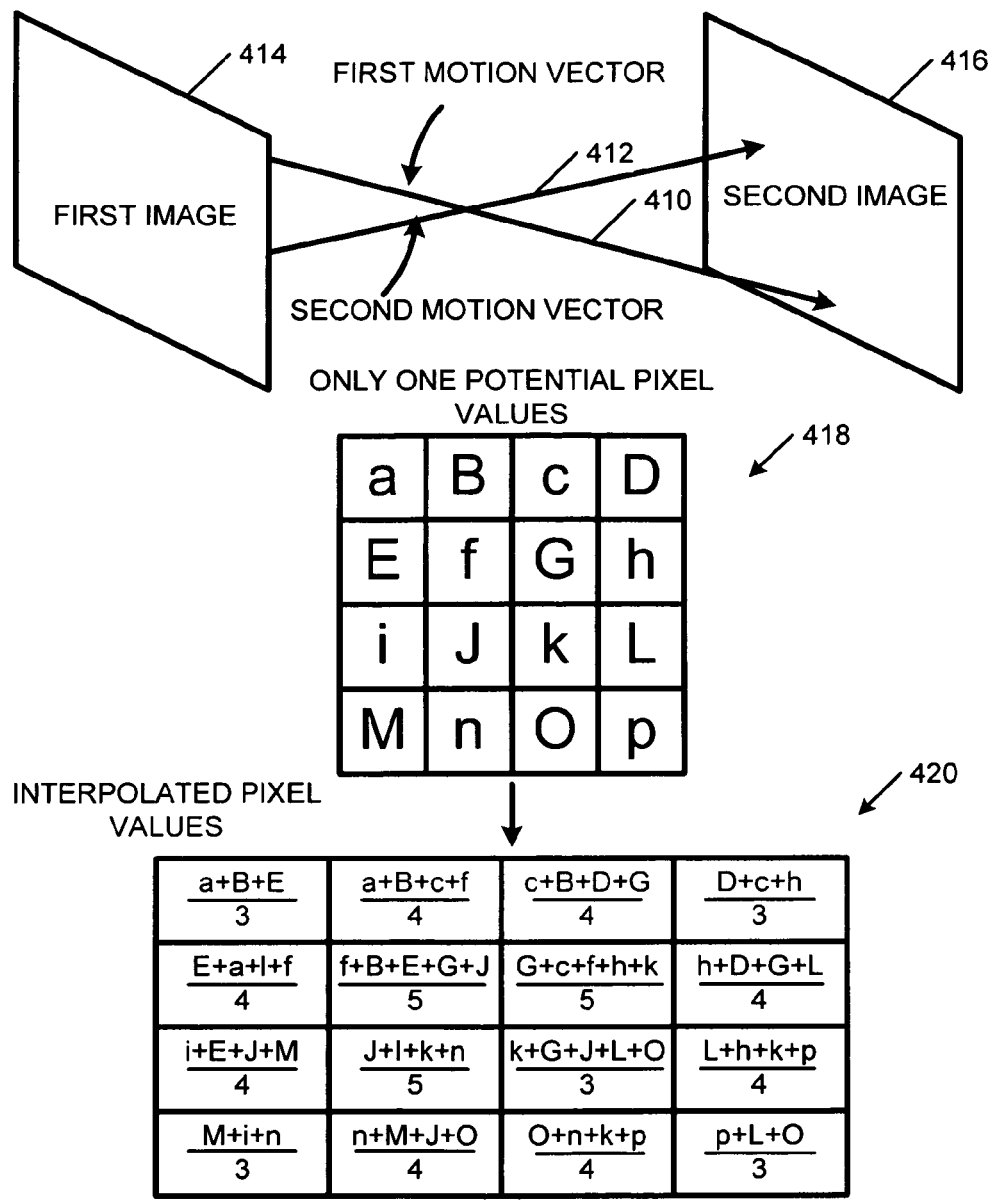
FIG. 4 is a nonlimiting example of the creation of a single potential set of pixel values for an intermediate image, such as may be created by the computing device from FIG. 2.
Figure 4:
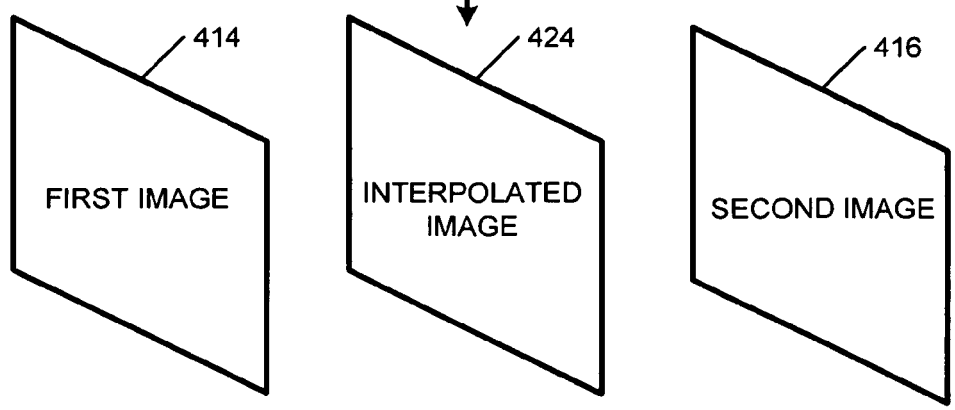

FIG. 4 is a nonlimiting example of the creation of a single potential set of pixel values for an intermediate image, such as may be created by the computing device from FIG. 2. As illustrated in the nonlimiting example of FIG. 4, a first image 414 and a second image 416 may define a first motion vector 410 and a second motion vector 412. However, in this nonlimiting example, a single set of potential pixel values 418 for an interpolated image may be determined from the first motion vector 410 and the second motion vector 412. The potential pixel values in this nonlimiting example are represented as a combination of lower case and upper case letters a-p. The potential pixel values determined from the first motion vector 410 are labeled in the lower case letters, and those determined from the second motion vector 412 are labeled in the upper case letters. In other words, each of potential pixel value is determined based on one of the motion vectors.

From the single set of potential pixel values 418 interpolated pixel values 420 can be determined. As illustrated, the interpolated values can be determined via an averaging algorithm, however this is not a requirement. More specifically, depending on the particular configuration, a static algorithm and/or a dynamic algorithm may be utilized. As in the nonlimited embodiment, the interpolated pixel value is the average of the corresponding potential pixel value and the nearby potential pixel value. More particularly, the interpolated pixel values in the left-up corner is determined from the average of the corresponding potential pixel value "a", the nearby potential pixel value "B", and the nearby potential pixel value "E". From the set of interpolated pixel values 420, an interpolated image 424 can be determined between a first image 422 and a second image 426. The set of interpolated pixel values 420 may be determined as an average (via an averaging algorithm) of the potential pixel values of the corresponding pixels and those of adjacent pixels. Thus, the interpolated pixel value of the top left pixel is $$\frac{(a + B + E)}{3},$$

where "a" is the potential pixel value of the top left pixel associated with the first motion vector. Similarly, in this nonlimiting example, "B" and "E" are those of the neighbor pixels associated with the second motion vector.

Figure 5:
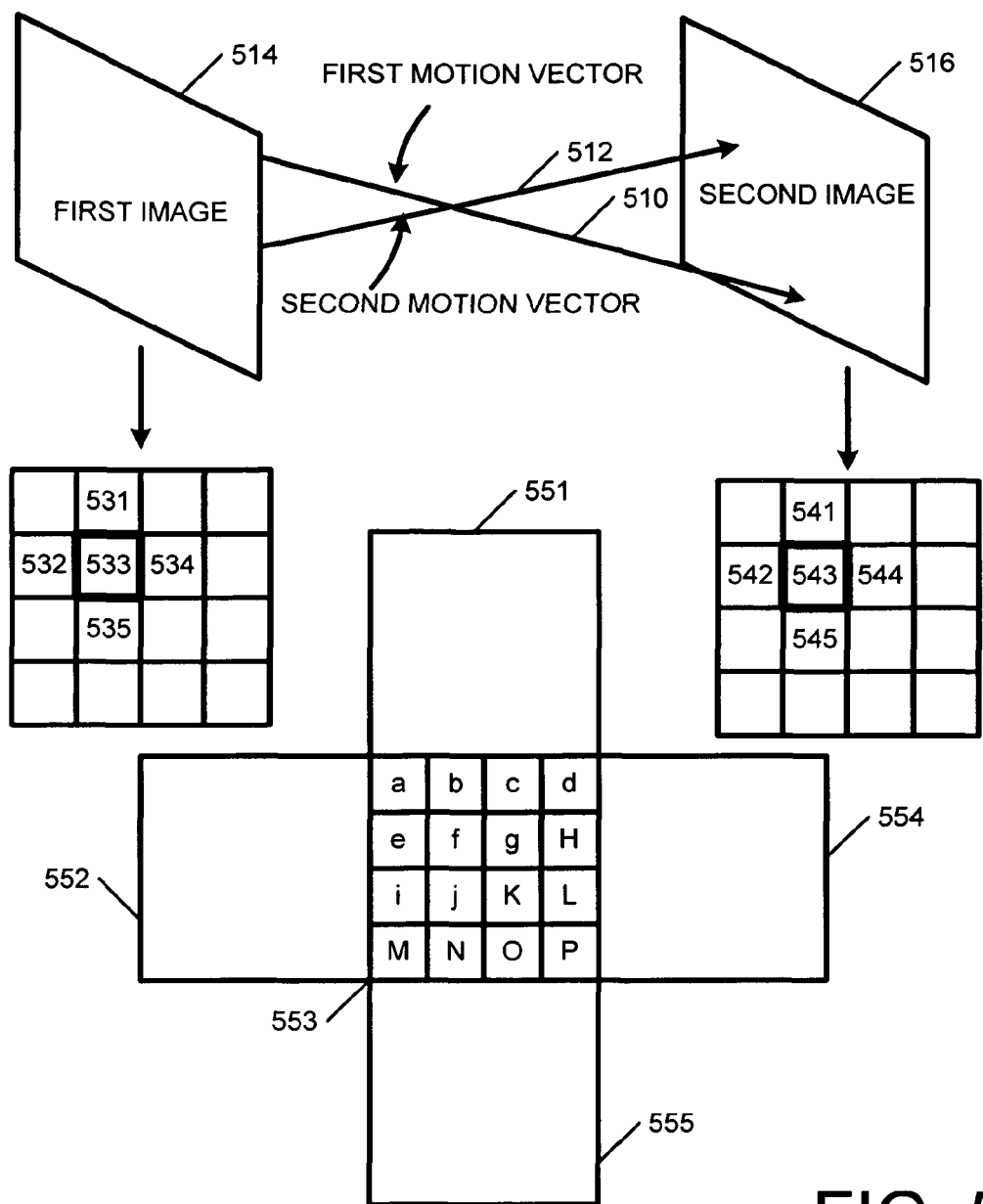
FIG. 5 is a nonlimiting example of the creation of an interpolated image, utilizing first potential pixel values and second potential pixel values, such as in the computing device from FIG. 2.
Figure 5:
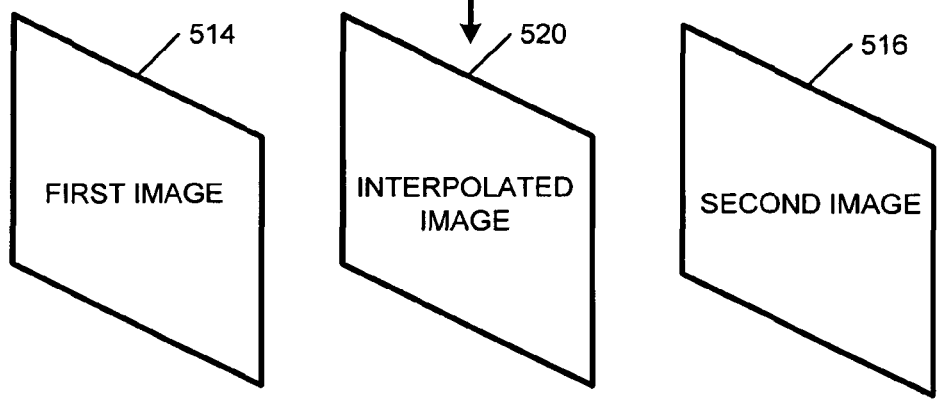

FIG. 5 is a nonlimiting example of the creation of an interpolated image, utilizing first potential pixel values and second potential pixel values, such as in the computing device from FIG. 2. As illustrated in the nonlimiting example of FIG. 5 a first image 514 may include a first plurality of pixels. Similarly, a second image 516 may include a second plurality of pixels. As discussed above, at least a portion of the first plurality of pixels may correspond with at least a portion of the second plurality of pixels. Accordingly, a first motion vector 510 may define the motion of an object that is common to both the first image 514 and the second image 516. Similarly, the second motion vector 512 may be configured to define the motion of a different object that is common to both the first image and the second image.

Additionally, in determining a potential pixel value associated with the motion vectors, block of pixels may be defined for each image 514, 516. As a nonlimiting example, the block 553 may be mapped to block 533 and block 543. For one or more blocks of pixels, the motion vectors may be determined from the corresponding block of pixels of the first image and the corresponding block of pixels of the second image. As a nonlimiting example, the motion vectors could be determined from the differences between the objects on the first image and that on the second image. Then, the candidate motion vectors for one or more of the blocks of pixels could be determined. Additionally, a dominate motion vector for one or more blocks of pixels may be determined from the candidate motion vectors. As another nonlimiting example, the dominate motion vector may be the one with the least error comparing the corresponding object of the first image and that of the second image. In such an embodiment, the dominated motion vectors of the block 551, 552, 553 may be the first motion vector and those of the block 554, 555, may be the second motion vector. Next, potential pixel values may be generated for each block. In such an embodiment, with regard to block 553, the previous dominate motion vectors may be used as a reference. Now, the potential pixel value of the top left pixel may be associated with the first motion vector according to the weighting of the dominate motion vector of the current block 553 and those of the neighbor block 551, 552. The weighting is changed according to the location of the pixel. The potential pixel values of the right column in the block 553 are most associated with the second motion vector due to the weighting of the dominate motion vector of the block 554.

Additionally, in at least one embodiment, a motion vector may be generated from the difference of an object in two images. The object in this embodiment is an image block, such as an image block of 16×16 pixels or other size. As a nonlimiting example, one object may be represented in block 531. Similarly, the object may be represented in block 545 of the second image. The motion vector of this object is downward. Additionally, this object may be represented in block 553 of the intermediate image according to the motion vector.

Similarly, another object in block 532 of the first image may be moving to the right, as represented in block 544 of the second image. This motion vector can also be found and associated with block 553.

One should also note, that in at least one embodiment, there may be one or more motion vectors associated with a block of the intermediate image. One of the associated motion vectors may be selected as the dominant motion vector for that block. To select the dominant motion vector, a most reliable object may be chosen by comparing the first image and the second image. By doing this, the object with minimum error can be found. The motion vector of this object can be chosen as the dominant motion vector. Similarly, the dominant motion vector of other blocks may be determined.

Additionally, to improve image quality, the motion vector of each pixel within a block may be determined. To determine the motion vector of each pixel, one parameter of the determining algorithm may be determined based on the location of the pixel. A pixel near an edge of a block may be defined as the dominate motion vector of a neighboring block. Further, a pixel in the central area of a block may be defined as the dominate motion vector of that block.

Figure 6:
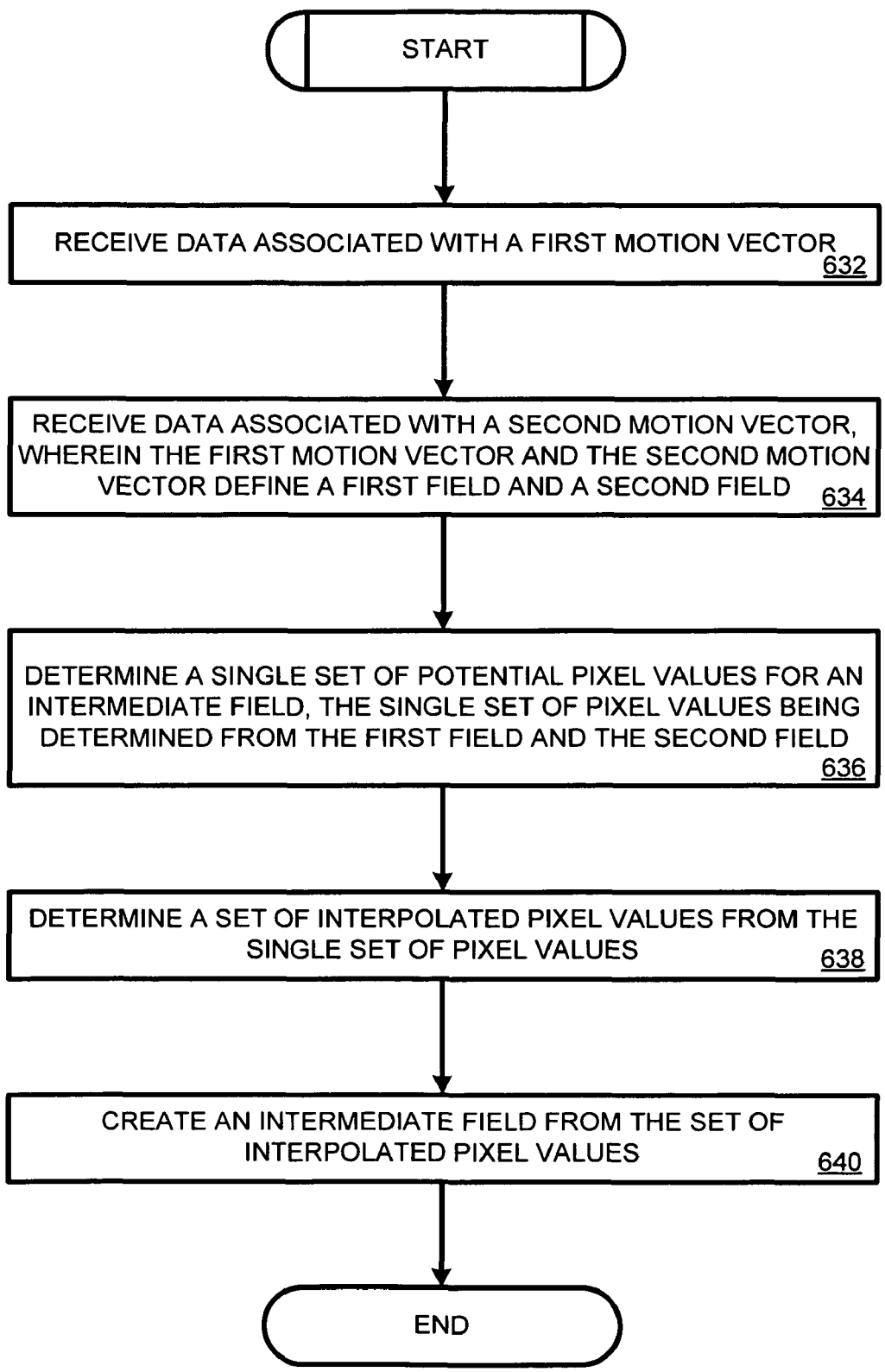
FIG. 6 is a flowchart illustrating a process for creating an intermediate image, such as may be performed by the computing device from FIG. 2.

FIG. 6 is a flowchart illustrating a process for creating an intermediate image, such as may be performed by the computing device from FIG. 2. As illustrated in the nonlimiting example of FIG. 6 the image determination logic 299 can receive data associated with a first motion vector 410 (block 632). The logic 299 can receive data associated with a second motion vector 412, wherein the first motion vector 410 and the second motion vector 412 define a first image 414 and a second image 416 (block 634). The logic 299 can determine a single set of potential pixel values 418 for an intermediate image 424, the single set of pixel values 418 being determined from the first image 414 and the second image 416 (block 636). The logic 299 can determine a set of interpolated pixel values 420 from the single set of pixel values 416 (block 638). The logic 299 can create an intermediate image 424 from the set of interpolated pixel values 420 (block 640).

Figure 7:
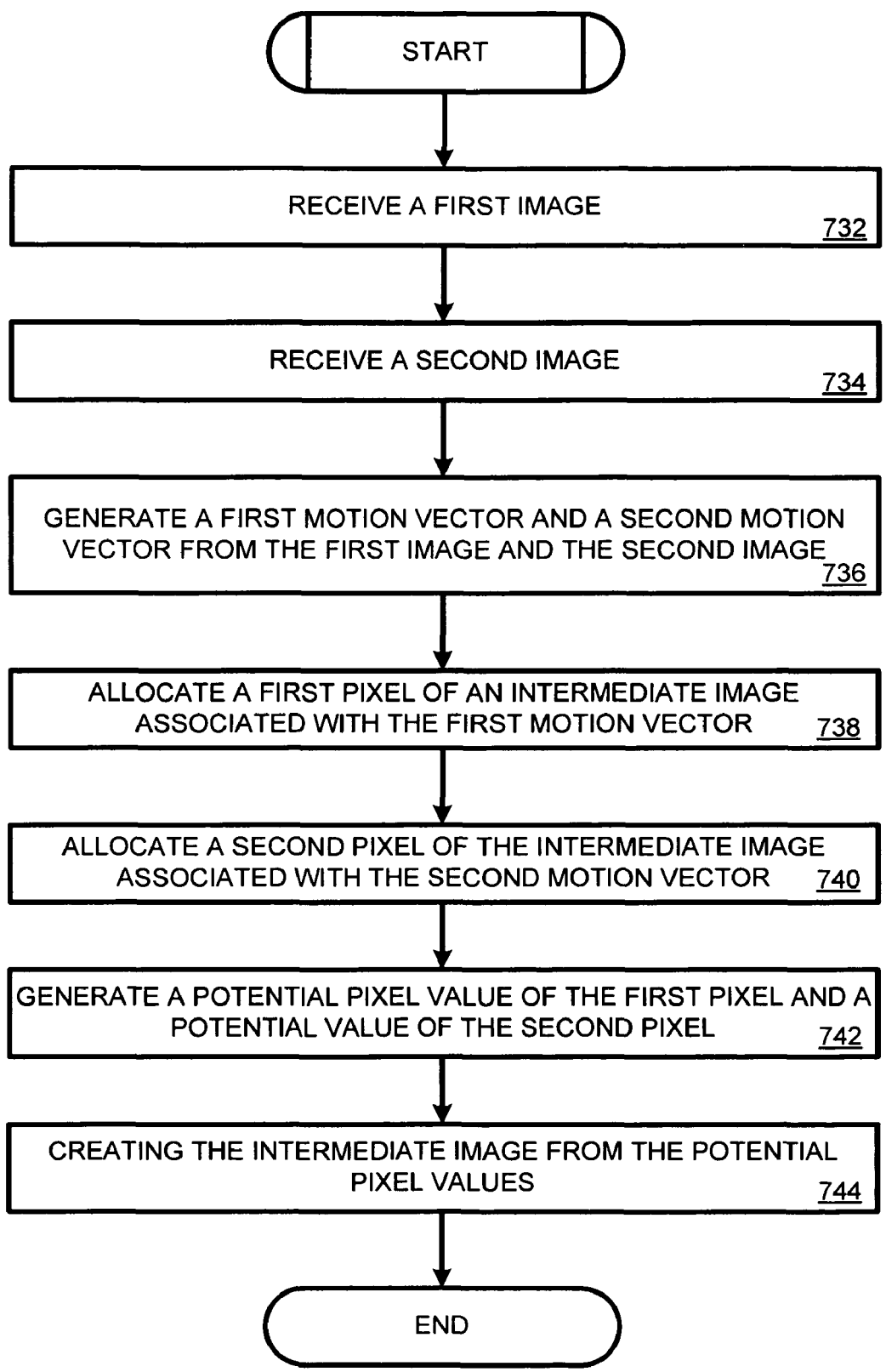
FIG. 7 depicts an exemplary embodiment of a process that may be utilized for creating an intermediate image, similar to the process from FIG. 6.

FIG. 7 depicts an exemplary embodiment of a process that may be utilized for creating an intermediate image, similar to the process from FIG. 6. As illustrated in the nonlimiting example of FIG. 7, a first image 514 may be received (block 732). Similarly, a second image 516 may be received (block 734). A first motion vector 510 and a second motion 512 vector may be generated from the first image 514 and the second image 516 (block 736). A first pixel of an intermediate image 520 that is associated with the first motion vector 510 may be allocated (block 738). Similarly, a second pixel of the intermediate image 520 that is associated with the second motion vector 512 may be allocated (block 740). A potential pixel value of the first pixel and a potential pixel value of the second pixel may be generated (block 742). Additionally, the intermediate image 520 may be created from the potential pixel values (block 744).

Figure 8:
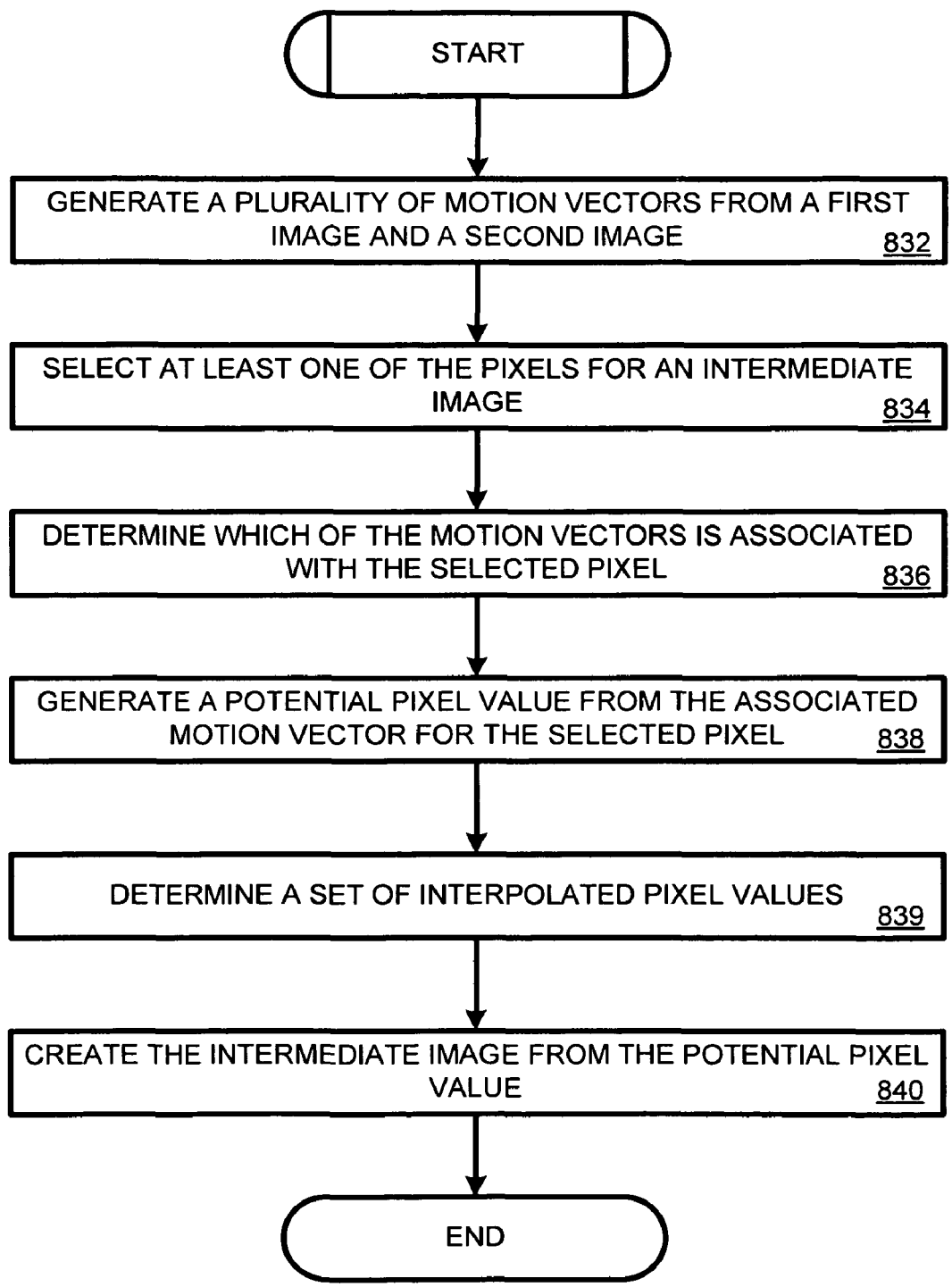
FIG. 8 depicts another exemplary embodiment of a process that may be utilized for creating an intermediate image, similar to the process from FIG. 6.

FIG. 8 depicts another exemplary embodiment of a process that may be utilized for creating an intermediate image, similar to the process from FIG. 7. More specifically, as illustrated in the nonlimiting example of FIG. 8, a plurality of motion vectors may be generated from a first image and a second image (block 832). Similarly, at least one of the pixels may be selected for an intermediate image (block 834). A determination of which of the motion vectors is associated with the selected pixel can be made (block 836). Similarly, a potential pixel value may be generated from the associated motion vector for the selected pixel (block 838). A set of interpolated pixel values may be determined (block 839). Additionally, the intermediate image may be created from the potential pixel value (block 840).

One should note that, in at least one embodiment, the intermediate image may be created by determining an interpolated pixel value from the potential pixel value. Similarly, in at least one embodiment, the interpolated pixel values may be determined utilizing an averaging algorithm of the potential pixel value of the selected pixel and the potential pixel value of the pixel adjacent to the selected pixel. Further, in at least one embodiment, the motion vector associated with the selected pixel may be determined according to a dominate motion vector neighboring on the selected pixel. Similarly, in at least one embodiment, the process may include dividing the intermediate image into a plurality of picture blocks, where the selected pixel is located to one of the picture blocks and determining a dominate motion vector for each picture block, where the motion vector associated with the selected pixel is selected from the group consisting of the dominate motion vector of the located picture block and the dominate motion vector of the picture blocks adjacent to the located picture block. Further, in at least one embodiment, the motion vector may be selected according to a spatial relation of the selected pixel corresponding to the picture blocks.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a image programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for determining an intermediate image, comprising:
   receiving a first image; receiving a second image;
   generating a first motion vector and a second motion vector from the first image and the second image;
   allocating a first pixel of an intermediate image associated with the first motion vector;
   allocating a second pixel of the intermediate image associated with the second motion vector;
   determining, for each of a plurality of blocks, a dominate motion vector from one of the first motion vector and the second motion vector;
   for each pixel of each block, selecting a motion vector from among the dominate motion vectors;
   generating a potential pixel value of the first pixel and a potential pixel value of the second pixel based on the selected motion vectors; and
   creating the intermediate image from the potential pixel values.

2. The method of claim 1, wherein the intermediate image is created by determining an interpolated pixel value of a first pixel of the intermediate image from the potential pixel values.

3. The method of claim 2, wherein the interpolated pixel values is determined utilizing an averaging algorithm of the potential pixel values.

4. The method of claim 2, wherein each of the potential pixel values are selected from the potential value of the first pixel and the potential value of a second pixel adjacent to the first pixel.

5. The method of claim 1, wherein at least one of the following: the selected motion vector is selected from a block of the dominate motion vector; and the selected motion vector is selected a block adjacent the dominate motion vector.

6. The method of claim 1, further comprising integrating the intermediate image between the first image and the second image.

7. The method of claim 1, further comprising providing the intermediate image between the first image and the second image for display.

8. A method for generating an intermediate image between a first image and a second image, the intermediate image having a plurality of pixels, comprising:
   generating a plurality of motion vectors from the first image and the second image;
   selecting at least one of the pixels for the intermediate image;
   determining which of the motion vectors is associated with the selected pixel;
   determining, for each of a plurality of blocks, a dominate motion vector from one of the plurality of motion vectors;
   for each pixel of each block, selecting a motion vector from among the dominate motion vectors associated with one of the plurality of motion vectors;
   generating a potential pixel value from the associated motion vector for the selected pixel based on the selected motion vectors; and
   creating the intermediate image from the potential pixel value.

9. The method of claim 8, wherein the intermediate image is created by determining an interpolated pixel value from the potential pixel value.

10. The method of claim 9, wherein the interpolated pixel value is determined by utilizing an averaging algorithm of the potential pixel value of the selected pixel and the potential pixel value of at least one of the pixels adjacent to the selected pixel.

11. The method of claim 8, wherein the motion vector associated with the selected pixel is determined according to a dominate motion vector neighboring the selected pixel.

12. The method of claim 8, the determining step further comprising:
   dividing the intermediate image into a plurality of picture blocks, wherein the selected pixel is located to one of the picture blocks; and
   wherein the motion vector associated with the selected pixel is selected from the group that includes the following:
   the dominate motion vector of the located picture block; and
   the dominate motion vectors of the picture blocks adjacent to the located picture block.

13. The method of claim 12, wherein the motion vector is selected according to a spatial relation of the select pixel corresponding to the picture blocks.

14. A system for determining an intermediate image, comprising:
   a receiving component configured to receive a first image and a second image;
   a generation component configured to generate a plurality of motion vectors from the first image and the second image;
   a selection component configured to select a potential pixel value for at least one of the motion vectors according to dominate motion vectors derived according to errors associated with at least one object in the first image and the second image;
   a first determining component configured to determine a first potential pixel value from the selected motion vector; and a creating component configured to create the intermediate image from the single set of potential pixel values.

15. The system of claim 14, further comprising a second determining component configured to determine a set of interpolated pixel values from the potential pixel values.

16. The system of claim 15, wherein the set of interpolated pixel values is determined utilizing an averaging algorithm of the potential pixel values.

17. The system of claim 14, further comprising logic configured to integrate the intermediate image between the first image and the second image.

18. The system of claim 14, further comprising logic configured to provide the intermediate image for display.

19. The system of claim 14, further comprising logic configured to provide the intermediate image between the first image and the second image for display.

20. A non-transitory computer readable medium for determining an intermediate image, comprising:
receiving logic configured to receive a first image and a second image;
generating logic configured to generate a first motion vector from the first image and the second image, the generating logic further configured to generate a second motion vector from the first image and the second image;
first determining logic configured to determine a first pixel of the intermediate image associating with the first motion vector, the first determining logic further configured to determine a second pixel of the intermediate image associating with the second motion vector;
second determining logic configured to determine a first potential pixel value for an intermediate image from the first motion vector and to determine a second potential pixel value for the intermediate image from the second motion vector based on motion vectors selected from among dominate motion vectors derived according to an object having a minimum error, the object being in the first image and the second image; and
creating logic configured to create the intermediate image from the single set of potential pixel values.

21. The computer readable medium of claim 20, further comprising third determining logic configured to determine a set of interpolated pixel values from the first potential pixel value and the second potential pixel value.

22. The computer readable medium of claim 21, wherein the set of interpolated pixel values is determined utilizing an averaging algorithm of the potential pixel values.

23. The computer readable medium of claim 20, further comprising integrating logic configured to integrate the intermediate image between the first image and the second image.

24. The computer readable medium of claim 20, further comprising providing logic configured to provide the intermediate image between the first image and the second image for display.

* * * * *